3,823,128
PREPARATION OF EDIBLE PROTEIN FROM LEAFY GREEN CROPS SUCH AS ALFALFA
Emanuel M. Bickoff, Oakland, and George O. Kohler, El Cerrito, Calif., assignors to the United States of America as represented by the Secretary of Agriculture
Continuation of abandoned application Ser. No. 147,947, May 28, 1971. This application May 14, 1973, Ser. No. 360,251
Claims priority, application Republic of South Africa, May 16, 1972, 72/3,347
Int. Cl. A23j 1/14
U.S. Cl. 260—112 R                  13 Claims

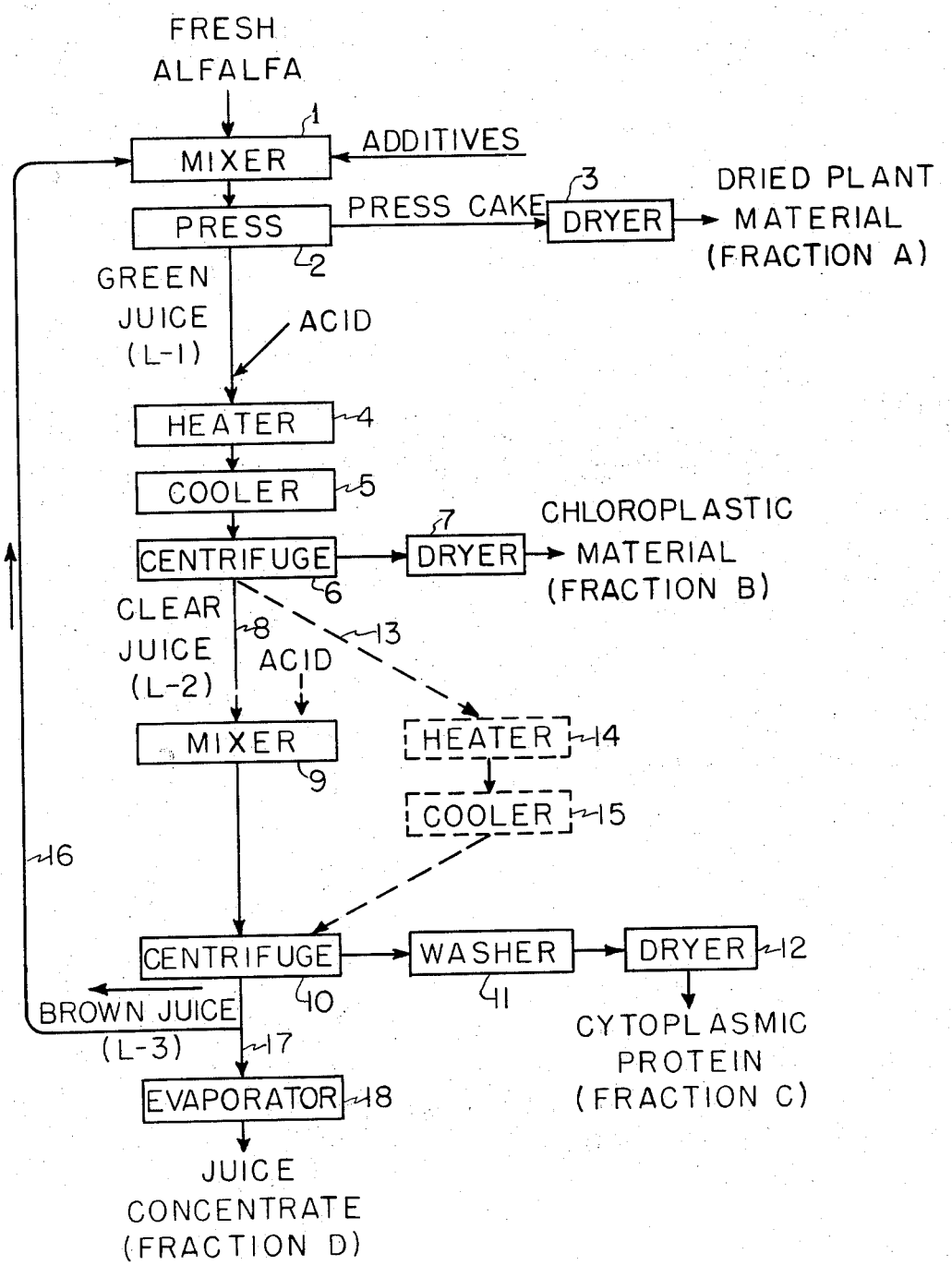

ABSTRACT OF THE DISCLOSURE

Juice obtained from alfalfa or other leafy green crops is treated to isolate a protein fraction useful for supplementing low-protein foods. A feature of the invention is the application of treatments to first remove a highly-pigmented chloroplastic protein fraction, and then to precipitate a protein fraction free from chlorophyll and other pigments.

---

This is a continuation-in-part of our co-pending application, Ser. No. 147,947, filed May 28, 1971, now abandoned.

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel processes for fractionating alfalfa and other leafy green crops whereby to obtain an edible, food-grade protein plus other fractions useful for animal feeding and other purposes. Further objects of the invention will be evident from the following description wherein parts and percentages are by weight unless otherwise specified.

The annexed drawing is a flow sheet illustrating the practice of the invention.

In the following description, emphasis is directed to the treatment of alfalfa, which constitutes the major forage crop in the United States. Reference to this particular material is, however, made by way of illustration, not limitation. In its broad ambit, the invention is applicable to leafy green crops in general, for example, grasses, lespedeza, clover, alfalfa, and similar conventional forages, and other leafy green vegetable materials such as lettuce, cabbage, kale, pea or bean vines, celery tops, beet tops, and the like, grown deliberately for animal feeding or available as wastes or by-products from food packaging or processing establishments.

It is well-known that alfalfa is a rich source of valuable nutrients including proteins, carotene (pro-vitamin A), lipids, sugars, mineral salts, unidentified growth factors (UGF), etc., and procedures have been advocated for separating various of these components. In general, these procedures are useful only to furnish products useful for animal feeding. Attempts have been made to isolate the proteins so that they could be used for food purposes, for instance, to enrich grains or other foods low in protein content. These attempts have not met with success because the isolates were contaminated with other alfalfa components so that they could not be used for food purposes. Typically, the isolates contained substantial proportions of chlorophyll; they were green in color and bitter in taste so that they could not be used in food products.

In the co-pending application of Bickoff, Spencer, and Kohler, Ser. No. 883,544, filed Dec. 9, 1969, now Pat. 3,684,520, there is disclosed a process for fractionating alfalfa which yields—among other fractions—a protein concentrate. This product is valuable as a high-energy ration for feeding animals, particularly poultry. Although the product is rich in proteins, it also contains substantial proportions of other substances such as oxidation-labile lipids, chlorophyll, tannins, and various phenolic pigments. Consequently, it is not suitable for human use.

A particular object of the invention is to provide fractionation procedures which yield protein products of such a state of purity that they can be applied as human food. Further objects of the invention are to provide fractionation procedures which additionally yield fractions useful for animal feeding and other purposes.

The objects of the invention are attained by applying to alfalfa—or other leafy crop—a procedure which can basically be divided into the following major operations:

(I) Formation of green juice (L–1).—Incidental to this operation is production of dried plant material (Fraction A) useful in animal feeding.

(II) Separation of Fraction B from the green juice (L–1).—Fraction B is a product containing the chloroplastic proteins; chlorophyll; carotene, xanthophyll, and other carotenoids; and lipids. It is useful in animal feeding because it is low in fiber and high in protein, carotene, and xanthophyll. The residue from this operation is termed the clear juice (L–2).

(III) Separation of Fraction C from the clear juice (L–2).—Fraction C constitutes the primary product of the invention and contains the cytoplasmic proteins derived from the original alfalfa. It is essentially free from chlorophyll, carotenoids, lipids, and bitter principles and other undesired flavor- and color-producing components. It may be noted that the cytoplasmic proteins are the ones most desirable for human use.

The residue from this operation is termed the brown juice (L–3); it may be concentrated to provide a syrup (Fraction D) useful in animal feeding or it may be added back to Fraction A (prior to drying) in the form of a juice or a syrup.

The practice of the invention is next described in detail, having reference to the drawing, and applied to alfalfa by way of example.

OPERATION I

Formation of Green Juice

The starting material for the fractionation is fresh green alfalfa, preferably in chopped form. In usual farming practice, alfalfa is chopped as it is harvested. This conventional chopped green plant material is the starting material of choice for our process.

The fresh green material is fed into mixer 1 which may take the form, for example, of a vessel provided with a mixing screw, or a rotary drum. Mixer 1 is advantageously used for incorporating desired additives into the alfalfa mass. The additives may be added as such, or dissolved in water, or part of the brown juice (L–3) may be recycled for use as a solvent for the additive. A preferred additive is sodium metabisulphite or other source of sulphite ion. Another preferred additive is ammonia or other alkalizer. Other additives which may be used include ascorbic acid and ethoxyquin. The influence of these additives is explained in a later portion of the description.

After the mixing step, the green alfalfa material is de-juiced by passing it—with or without prior grinding—through press 2 which may take the form, for example, of a set of conventional sugarcane rolls. Other devices which may be used for the dejuicing are screw presses or expellers. Since the aim is to secure as much juice as possible from the alfalfa, one may pass the plant material repeatedly through a single set of three pressing rolls, or, alternativelyl, pass the material through a stand of several sets of three pressing rolls. The plant material received from one pressing may advantageously be mixed with a further allotment of additives before it is passed to the next set of pressing rolls.

In this dejuicing operation, there is produced a green juice fraction (L-1) and a press cake of fibrous material. Generally, this press cake will have a moisture content of about 65–75%. The respective amounts of juice and press cake will vary depending primarily on the moisture content of the starting material. In typical operations, 100 lbs. of green alfalfa will yeild (a) about 50 to 60 lbs. of press cake and (b) a total amount of juice of about 40–50 lbs. plus the amount of liquid (water or brown juice) added in the mixing step per 100 lbs. of alfalfa.

The press cake is conveyed through dryer 3, which may take the form of a rotary kiln conventionally used in alfalfa drying operations, yielding a dried product herein designated as Fraction A, and which is useful in animal feeding. Alternatively, brown juice (L-3) can be added to the press cake prior to drying to increase the protein content and decrease the fiber content thereof. In this particular preferred embodiment of the invention, the brown juice can be added as is or it can be concentrated to a syrup prior to addition to the press cake.

In runs employing high quality alfalfa as obtained in northern California, Fraction A contains (on dry basis) the following:

| | | |
|---|---|---|
| Protein[1] | percent | 23 |
| Fat | do | 4 |
| Fiber | do | 23 |
| Ash | do | 10 |
| NFE[2] | do | 40 |
| Carotene | mg./lb. | 150 |
| Xanthophyll | mg./lb. | 350 |

[1] Nitrogen content×6.25.
[2] Nitrogen-free extract (mostly carbohydrates), by difference.

Applied to typical alfalfa as obtained under commercial operation, the protein content will run several percent lower.

Hereinabove, it has been noted that certain additives may be incorporated with the alfalfa in mixer 1 prior to pressing. We have found that if an alkalizer is added, a greater proportion of protein will be transferred from the plant material to the green juice. This is a desirable situation as it means that a larger amount of protein will be formed in the subsequent operations when Fractions B and C are isolated. As the alkalizer, one may use ammonia, ammonium hydroxide, or sodium or potassium hydroxides or carbonates. Usually, enough of the alkalizer is added to establish a pH of about 6 to 8, preferably 6 to 7.

In applying the alkalizer, it is preferably dissolved in water and the resulting aqueous solution mixed with the alfalfa. The addition of water is further helpful to increase the transfer or protein from the plant tissue to the green juice. Moreover, instead of using water, one can use the brown juice (L-3) remaining as a residue from Operation III. For example, in continuous operation in accordance with the invention, a portion of L-3 may be continuously recycled to mixer 1. In the event that water (or brown juice) is used as an additive, it is preferably applied in the proportion of about 1 to 3 lbs. thereof per lb. of alfalfa.

Various substances may be optionally incorporated with the alfalfa in the juicing step. For example, a conventional antioxidant may be added to minimize deterioration of carotenoids. For this purpose one may employ any of the antioxidants known to be useful for preserving carotenoids in alfalfa and other feed materials. Typical compounds in this category are those disclosed in Pats. 2,562,970, 2,611,703, 2,651,572, 2,686,124, and 2,711,962, a preferred example being 6-ethoxy-22,4-trimethyl-1,2-dihydroquinoline, commonly known as ethoxyquin. Only a minor amount of the antioxidant is required—about 0.01% to 0.5%, based on the dry weight of alfalfa.

The use of sodium metabisulphite, or in general any source of sulphite ion, as an additive is preferred. The primary benefit obtained by the addition of a sulphite is that the cytoplasmic protein product (Fraction C) obtained in a later step of the process has improved properties. Most importantly, this product has improved nutritional qualities. Its protein efficiency ratio is equivalent to that of casein and its digestibility is enhanced. In addition, the product is particularly pure and light-colored (white to ivory). In this regard it is believed that the sulphite inhibits the formation of brown pigments of a tannin-like nature which combine with the protein to form products which cannot be decolorized. Thus, without added sulphite the product is tan or even brown.

Although sodium metabisulphite is generally used because it is an economical and convenient source of sulphite ion, one can also use such compounds as sodium sulphite or bisulphite, potassium sulphite or bisulphite, ammonium sulphite or bisulphite, sodium hydrosulfite, sulphur dioxide gas, sulphurous acid, and the like. Such additive is generally employed in an amount to provide about 0.01 to 0.5 parts of sulphite ion per 100 parts (dry weight) of alfalfa. In general, the sulphite is added at any time before the green juice is heated, and preferably is added to the alfalfa before it is pressed. Where the selected sulphite additive has an acidic nature (sodium metabisulphite, for example) it is preferred to first mix it with an alkalizer (such as those exemplified above) to increase its pH to a level of about 7 to 11. It is obvious that where the sulphite is adjusted to an alkaline pH, one obtains the benefit of both the sulphite and the alkalizer. A convenient method of applying the sulphite is, for example, as follows: An aqueous solution containing about 1 to 10% sodium bisulphite is prepared and to this is added sufficient sodium hydroxide to give the solution a pH of about 7–11. The resulting solution is then preferably sprayed on the alfalfa as it is being chopped or at least before it is subjected to pressing.

Another plan to enhance the transfer of proteins from the plant tissue to the green juice is to reduce the size of the alfalfa pieces. This is conveniently done by providing mixer 1 with rotating blades, or the like, to cause a comminution of the plant particles as they are contacted with the water (or brown juice) containing the alkalizer. Alternatively, the alfalfa may be ground before it is applied to mixer 1. For best results (maximum transfer of proteins to the juice), the comminution is applied as alfalfa is mixed with the additives in mixer 1.

It is within the broad ambit of the present invention to carry out Operation I (formation of the green juice) in the same manner as disclosed in the aforesaid Pat. 3,684,520, the disclosure of which is incorporated herein by reference.

EXAMPLE 1

This example illustrates how increase in pH enhances the transfer of proteins from the alfalfa tissue to the green juice.

Twenty-five gram portions of fresh chopped alfalfa were mixed with 250-ml. portions of water and the pH adjusted (by addition of hydrochloric acid or sodium hydroxide) to a particular level as given below. The mixtures were blended for two minutes and then separated into their components of fibrous plant material and green juice, the latter being analyzed for nitrogen content.

The conditions used and the results obtained are tabulated below.

| pH: | Nitrogen content of green juice, percent of total N in alfalfa |
|---|---|
| 4.0 | 18.6 |
| 4.7 | 25.4 |
| 5.3 | 48.7 |
| 5.8 [1] | 65.1 |
| 6.0 | 68.0 |
| 6.5 | 69.4 |
| 7.0 | 69.8 |
| 7.5 | 69.9 |
| 8.0 | 70.0 |
| 8.5 | 70.1 |

[1] Natural pH of juice.

EXAMPLE 2

This example illustrates how disintegration of the alfalfa enhances the transfer of proteins from the alfalfa tissue to the green juice.

Twenty-five gram portions of fresh chopped alfalfa were mixed with 250-ml. portions of water, and the pH adjusted to 8 with sodium hydroxide. The mixtures were then subjected to disintegrating action, applied by exposing them for various time periods to a rotating blade which exerted a cutting action on the alfalfa shreds. The mixtures were then separated into their components of fibrous plant material and green juice, the latter being analyzed for nitrogen content.

The conditions used and the results obtained are tabulated below.

| Duration of disintegration action, min.: | Nitrogen content of green juice, percent of total N in alfalfa |
|---|---|
| 1 | 45 |
| 2 | 68 |
| 4 | 86 |

OPERATION II

Separation of Chloroplastic Material (Fraction B)

The green juice (L–1) formed in press 2 is employed as the starting material in this operation. It is desirable that there be no substantial delay between the formation of the green juice in the pressing step and initiation of Operation II since hydrolysis of protein rapidly occurs once the cells are ruptured.

In this operation (II), the green juice is treated to selectively remove a fraction containing chloroplastic proteins, chlorophyll, carotenoids, and lipids, while leaving the cytoplasmic proteins in solution in the residual juice (L–2).

As a preliminary step, the green juice may be subjected to a slow-speed centrifugation, filtration, or the like, to remove gross impurities such as sand, dirt, and fibers. In the event that the alfalfa was washed sufficiently prior to pressing, much of these impurities will not be present and this preliminary step can be omitted.

In a preferred embodiment of the invention, the pH of the juice is initially adjusted, where necessary, to bring it to a level of about 6–7. If the juice is alkaline as a result of ammonia or other base having been added in the pressing step, this pH adjustment would require addition of hydrochloric, sulphuric, phosphoric, or other non-toxic acid.

The green juice—with or without pH adjustment—is then subjected to a special treatment involving rapid heating, a short holding of the hot juice, followed by rapid cooling, whereby to form an agglomerate containing chloroplastic proteins, chlorophyll, carotenoids, and lipids, while retaining the cytoplasmic proteins in solution. This special treatment constitutes a critical step in the process of the invention because it yields the desired *selective* fractionation. Thus, it results in agglomeration of the chloroplastic material—the chloroplastic proteins, chlorophyll, carotenoids, and lipids—whereas the cytoplasmic proteins remain in solution. Heat treatments outside the range specified herein which are used in the art are incapable of either yielding such selective action, or being adapted to continuous operation. The typical heat treatments described in the art yield a precipitate containing all the proteinous material, both chloroplastic and cytoplasmic, plus chlorophyll, carotenoids, and lipids.

The treatment of the invention used to attain the selective agglomeration of the chloroplastic material (Fraction B) is described in detail as follows:

The green juice is directed to heater 4 wherein it is brought to a temperature of 55°–70° C., preferably 55°–60° C., by application of very rapid heating, i.e., so that the said temperature is reached in 0.6 second or less. Thus, in this heating step, the temperature reached is important, but even more critical is that the heating be done very rapidly. Such type of heating is accomplished by the use of a steam injection heater, wherein steam is introduced directly into the juice as it flows through the device. When the juice has been brought to the said temperature, it is held thereat for at most a short period of time (0 to 40 seconds), and is then directed to cooler 5 where it is rapidly cooled to 40–45° C. At this point the chloroplastic material is in an agglomerated state and is ready for removal from the residual liquid containing the cytoplasmic proteins.

The treatment of the invention using a rapid heating operation yields not only the desired selective fractionation described above, but also provides other practical advantages. For example, it permits continuous operation because the heating apparatus does not get fouled. On the other hand, the prolonged heating used in other methods causes fouling of the apparatus by deposition of proteinous and other materials on the walls of the heat exchanger so that the process cannot be applied continuously; it must be operated batch-wise with cleaning between each run.

Other advantages of the treatment of the invention are a minimum loss of white (cytoplasmic) protein and formation of a readily-separable fraction of green (chloroplastic) protein.

After the green juice has been heated and cooled as above described to form the agglomerate of chloroplastic material, it is (while still at about 40–45° C.) centrifuged at high speed (block 6) to yield (1) the residual clear juice (L–2) containing cytoplasmic proteins in solution and (2) the chloroplastic material containing chloroplastic proteins, chlorophyll, carotene, xanthophyll and other carotenoids, lipids, unidentified growth factors, etc.

The residual juice separated in the centrifugation is preferably cooled to room temperature and filtered before further treatment to remove any retained chloroplast material. Typically, the juice is filtered through a layer of diatomaceous earth in a filter press, whereby to produce a sparkling clear or polished liquid. The chloroplast fragments remain behind in the diatomaceous filter.

The chloroplastic material separated by the centrifuge 6 sometimes has a jelly-like consistency and as such is difficult to dry. The material adheres to the inside of the dryer and thus fouls the equipment. Also, it cannot be pressed to remove liquid. This situation is remedied, in accordance with the invention, by heating the jelly-like material to about 70–90° C., whereby its consistency is transformed from a jelly to a curdy material, i.e., one having the texture of cottage cheese. For best results, the jelly-like material is brought to a pH of about 8–8.5, prior to heating, by addition of a suitable amount of sodium hydroxide, ammonium hydroxide, or other alkalizer. In the curd form the material can be readily handled and dried as it does not adhere to equipment. Also, its moisture can be easily reduced by pressing.

In a typical embodiment of this phase of the invention the following steps are applied: After the chloroplastic material is separated by centrifuge 6, but before going to dryer 7, it is first brought to pH 8.0–8.5 and then is heated by means of steam injection to 70–90° C. for about 1 minute whereby it is changed from a jelly to a substance having the consistency of cottage cheese and which is water-expressible, that is, its moisture content can be easily reduced by pressing. Typically, the material is pressed against a filter cloth (in a Wilmess press or the like) whereby its solids content is increased, for example, from 12% to 40%. The resulting press cake is granuable and is passed through a granulator. Thereafter this granulated material is directed to dryer 7 which may take the form of a conventional double drum or a rotary kiln. Therein the material can be dried under mild conditions, thus preventing loss of xanthophyll, carotene, vitamin E, protein quality, and green color. The dried product, Fraction B, is a valuable material for animal feeding.

In typical runs Fraction B contains (on dry basis) the following:

| | | |
|---|---|---|
| Protein [1] | percent | 54.5 |
| Fat | do | 9.8 |
| Fiber | do | 1.56 |
| Ash | do | 13.1 |
| NFE [2] | do | 21.0 |
| Carotene | mg./lb | 500 |
| Xanthophyll | mg./lb | 1200 |

[1] Nitrogen content×6.25.
[2] Nitrogen-free extract (mostly carbohydrates), by difference.

Its high content of xanthophyll makes Fraction B especially useful in poultry-feeding rations to provide chickens with highly-pigmented (bright golden) skin, which most consumers prefer over chickens with pale skin. Also, in maintaining hens for egg production, such xanthophyll-rich rations are advantageous to provide eggs with yolks of a deep yellow color.

EXAMPLE 3

A steam injection heater capable of heating the green juice to 70° C. in 0.6 second or less was used in these runs. Samples of green juice were thus heated to various temperatures, i.e., 55, 60, 65, and 70° C. In some cases the hot juice was cooled (to 40–45° C.) immediately; in others, the juice was held while in the hot state for a definite period of time before cooling. In each case, the cooled product was centrifuged to remove the chloroplastic material and the resulting clear juice was analyzed to determine the amount of cytoplasmic protein remaining therein.

The conditions used and the results obtained are tabulated below.

The object of this operation is to separate the cytoplasmic proteins from the clear juice, and the object can be realized in several ways. The cytoplasmic proteins may be precipitated by any of the following alternative procedures:

(1) Addition of acid to provide a pH of about 3 to 4.8.

(2) Heating to a temperature above 65° C., e.g., 70–90° C.

(3) Addition of acid to provide a pH of about 3 to 4.8, plus heating to a temperature above 60° C., e.g., 65–80° C.

Moreover, any one or more of the aforesaid treatments may be applied in sequence to ensure recovery of all the coagulable protein. Such a technique may, for example, take the following forms.

The L-2 juice is heated to above 65° C., cooled, and the precipitated protein is removed. The residual liquor is then subjected to the same treatment one or more times, applying each time a successively higher temperature, and obtaining a series of protein isolates.

Alternatively, the above plan may be employed but using a succesively lower pH (with or without increasing temperature) again to receive a series of protein isolates.

A particularly preferred treatment involves successive acidification, without any application of heating, the procedure being conducted at ambient (room) temperature. The L-2 juice is first acidified to a pH of 4.8 and centrifugation is applied, whereby the major proportion (usually two-thirds) of the total cytoplasmic protein is isolated in particularly pure and undenatured form. The residual liquor is then acidified to a pH of 3 and centrifuged, whereby the remaining portion of the cytoplasmic protein is isolated in a form useful for human food, though not as pure as the first fraction.

Referring to the drawing, two alternative techniques for precipitating the cytoplasmic protein are depicted, one involving addition of acid, the other based on heat treatment.

In the procedure involving addition of acid, the clear juice (L-2) from centrifuge 6 is directed by line 8 to mixer 9 where it is mixed with sufficient acid to bring the pH to a level of 3 to 4.8. For this purpose one may use sulphuric, hydrochloric, phosphoric, or other non-toxic acid.

To separate the precipitated cytoplasmic protein, the acidified mixture is then centrifuged (block 10), whereby to yield (a) a curd containing the cytoplasmic proteins free from chlorophyll, carotenoids, lipids, and bitter principles or other undesired flavor components.

The cytoplasmic protein separated by centrifuge 10 is then washed in block 11 with water (acidified to a pH of about 4–5) to remove water-soluble impurities. After washing, the pH of the protein material is preferably ad-

| | Treatment conditions | | | Percent of original cytoplasmic protein remaining in clear juice | Appearance of clear juice |
|---|---|---|---|---|---|
| Temp., °C. | Heating time, seconds | Hold time (hot), seconds | Cooling time, seconds | | |
| 55 | 0.6 | 0 | 6.8 | 96 | Cloudy green. |
| 55 | 0.6 | 20 | 10.0 | 85 | Clear brown. |
| 60 | 0.6 | 0 | 10.4 | 88 | Cloudy brown. |
| 60 | 0.6 | 10 | 9.1 | 85 | Clear brown. |
| 60 | 0.6 | 20 | 10.6 | 83 | Do. |
| 65 | 0.6 | 0 | 11.4 | 80 | Do. |
| 70 | 0.6 | 0 | 10.2 | 71 | Do. |

OPERATION III

Separation of Cytoplasmic Protein (Fraction C)

The clear juice (L-2) remaining from Operation II is employed as the starting material in this operation.

justed to about neutrality by rinsing it with a dilute solution of sodium hydroxide, and it is directed to dryer 12—for example, conventional freeze-drying apparatus. The dried product, Fraction C, is valuable for human use, for example, for supplementing cereals and other foods deficient in protein content. In typical runs, Fraction C contains (on dry basis) the following:

| | | |
|---|---|---|
| Protein [1] | percent | 85 |
| Fat | do | 0.66 |
| Fiber | do | 0.20 |
| Ash | do | 4.32 |
| NFE [2] | do | 9.8 |
| Carotene | | None |
| Xanthophyll | | None |

[1] Nitrogen content×6.25.
[2] Nitrogen-free extract (mostly carbohydrates), by difference.

In the event that the alternative procedure of precipitation by heating is used, the clear juice (L-2) is directed by line 13 to heater 14 which may take the form of a direct steam injector and wherein the juice is brought to about 70 to 90° C. and preferably held at such temperature for a period of about 1-5 minutes.

The hot juice is then passed through cooler 15 wherein it is cooled to ambient temperature. By application of the above described steps, the cytoplasmic proteins are precipitated as a light cream-colored curd. To separate the curd, the mixture is centrifuged in block 10, and further treated by washing, drying etc., all as previously described.

The cytoplasmic protein product (Fraction C) may be obtained in especially pure form by washing the heat-precipitated product with dilute alkali (approximately pH 8.9). This washing step removes such impurities of a non-proteinous nature as pigments, carbohydrates, and salts.

The effect of alkali-washing is shown in the following example. Two lots of protein (Fraction C) obtained by heat-coagulation were first washed with water and then with dilute alkali, that is, water containing sufficient 1 N NaOH to give a pH of 9. This dilute alkali was applied to the protein for 30 minutes with stirring at room temperature and the washed protein then separated from the alkaline solution. The results are tabulated below.

| Lot | Protein content of product, percent | | Protein loss, percent |
|---|---|---|---|
| | After water wash | After alkali wash | |
| A | 89.1 | 100 | 2.6 |
| B [1] | 87.0 | 100 | 2.2 |

[1] This lot was prepared with the addition of bisulphite in Operation I.

EXAMPLE 4

This example illustrates acidification techniques for separating the cytoplastimc protein (Fraction C).

Samples of clear juice (L-2) were acidified to different pH's with hydrochloric acid, and centrifuged to remove the precipitated cytoplasmic protein. Analyses were conducted on both the residual juice and the precipitates. The conditions used and the results obtained are tabulated below.

| Run | pH | Protein content, as percent of protein in clear juice of— | |
|---|---|---|---|
| | | Cytoplasmic protein | Residual juice |
| 1 | 3.0 | 100 | 0 |
| 2 | 3.2 | 98 | 2 |
| 3 | 3.4 | 94 | 6 |
| 4 | 3.6 | 96 | 4 |
| 5 | 3.8 | 90 | 10 |
| 6 | 4.0 | 83 | 17 |
| 7 | 4.2 | 81 | 19 |
| 8 | 4.4 | 74 | 26 |
| 9 | 4.6 | 71 | 29 |
| 10 | 4.8 | 68 | 32 |

EXAMPLE 5

This example illustrates heating procedures for separating the cytoplasmic protein (Fraction C).

Samples of clear juice (L-2) having a pH of 5.8–6 were heated at different temperatures, cooled, and centrifuged to remove the precipitated cytoplasmic protein. Analyses were conducted on both the residual juice and the precipitates. The conditions used and the results obtained are tabulated below.

| Run | Heating conditions | | Protein content, as percent of protein in clear juice of— | |
|---|---|---|---|---|
| | Temp., °C. | Time, minutes | Cytoplasmic protein | Residual juice |
| 1 | 55 | 1 | 23 | 77 |
| 2 | 55 | 5 | 27 | 73 |
| 3 | 60 | 1 | 26 | 74 |
| 4 | 60 | 5 | 48 | 52 |
| 5 | 65 | 1 | 48 | 52 |
| 6 | 65 | 5 | 83 | 17 |
| 7 | 70 | 1 | 86 | 14 |
| 8 | 70 | 5 | 88 | 12 |
| 9 | 75 | 1 | 90 | 10 |
| 10 | 75 | 5 | 89 | 11 |
| 11 | 80 | 1 | 90 | 10 |
| 12 | 80 | 5 | 92 | 8 |

Directing attention to the drawing, the residual juice (L-3) from centrifuge 10 is divided into two portions. One portion is recycled via line 16 to mixer 1 for incorporation with new batches of alfalfa. The other portion is directed by line 17 to conventional flash evaporator 18 wherein it is concentrated to produce a syrup containing about 50–70% solids. This syrup, herein termed Fraction D, is a rich source of water-soluble nutrients derived from the original alfalfa. It is particularly valuable for its content of UGF (unidentified growth factors, which beneficially affect growth, health, and reproduction of various types of animals). It also contains amino acids, sugars, mineral salts, and water-soluble vitamins. In typical runs, Fraction D contains (on dry basis) the following:

| | | |
|---|---|---|
| Nitrogenous components | percent | 29 |
| Fat | | None |
| Fiber | | None |
| Ash | percent | 20 |
| NFE [1] | do | 51 |
| Carotene | | None |
| Xanthophyll | | None |

[1] Nitrogen-free extract (mostly carbohydrates), by difference.

The residual juice (L-3) may be used as a fiber diluent in the press cake (Fraction A). By adding this juice to the press cake the fiber may be reduced to a level comparable to that in the original whole alfalfa. As a result, a more valuable feed is obtained, since fiber is detrimental to monogastric animals. A typical example of the effect of adding the residual juice to the press cake is the following:

| Sample | Percent of— | | |
|---|---|---|---|
| | Protein | Fat | Fiber |
| Press cake (Fraction A) plus residual juice (L-3) | 18.4 | 3.8 | 24.3 |
| Press cake (Fraction A) | 18.4 | 4.5 | 35.7 |
| Residual juice (L-3) | 19.9 | 1.2 | 1.1 |
| Whole alfalfa | 23.8 | 4.6 | 21.6 |

EXAMPLE 6

Effect of Bisulphite on Nutritional Value and Color of Leaf Protein Concentrate (Fraction C)

Lots of cytoplasmic protein (Fraction C) were prepared using the following procedure.

A solution was prepared containing 7 gallons of water, 15 lbs. of sodium metabisulphite, and sufficient NaOH to give it a pH of 7. This solution was sprayed on a batch of fresh green alfalfa (10,000 lbs.), thus to provide about 0.1 gram of sulphite per 100 grams of fresh alfalfa. The alfalfa was pressed as described in Operation I and the green juice (L-1) collected. This liquid was then treated to agglomerate and remove the chloroplastic fraction as described in Operation II. The residual juice (L-2) containing the dissolved cytoplasmic protein was then divided into two lots for separation of Fraction C. In one case the cytoplasmic protein was recovered by heat coagulation at 70° C., as in Example 5; in the other case, acid precipitation (pH 4.5) was used as in Example 4.

For comparison purposes, samples of Fraction C were also prepared without addition of sodium metabisulphite.

All the products were then tested for nutritional value. Also for comparison, examples of casein as a source of dietary protein were included.

Protein efficiency ratio (PER) was determined by conventional methods, with a value of 2.50 for casein as the standard. Both diet and nitrogen digestibility were determined by standard procedures. In all three cases rat-feeding studies were employed.

The results are tabulated below.

| Lot | Dietary source of protein | Bisulphite, g. per 100 g. fresh alfalfa | PER | Digestibility, percent | |
|---|---|---|---|---|---|
| | | | | Diet | Nitrogen |
| 1 | Fraction C (heat precipitated) | 0.1 | 2.57 | 93 | 91 |
| 2 | do | None | 2.15 | 93 | 89 |
| 3 | Fraction C (acid precipitated) | 0.1 | 2.60 | 92 | 88 |
| 4 | do | None | 2.29 | 92 | 86 |
| 5 | 9.3% Casein | | 2.64 | 95 | 92 |
| 6 | 10.3% Casein | | [1] 2.50 | 94 | 93 |

[1] Standard.

The absorption of samples from Lots 1 and 2 above was measured spectrophotometrically at 450 mm. The results are summarized as follows:

| Lot | Protein | Bisulphite, g. per 100 g. fresh alfalfa | Absorption (at 450 mm.) |
|---|---|---|---|
| 1 | Fraction C (heat precipitated) | 0.1 | 12.0 |
| 2 | do | None | 23.9 |

A lower absorption value is indicative of less pigmentation or less color. Thus Lot 2 is approximately twice as dark as Lot 1.

Having thus described the invention, what is claimed is:

1. A process for fractionating green, leafy, vegetable material, which comprises:
    (a) pressing the material to form a juice and a press cake,
    (b) heating the juice to a temperature of about 55–70° C. in a period of about 0.6 second or less, holding the juice at said temperature for a period of 0 to 40 seconds, and rapidly cooling it to a temperature of about 40–45° C., whereby to form an agglomerate containing chloroplastic proteins, chlorophyll, carotenoids, and lipids while retaining cytoplasmic proteins in solution in the juice, and
    (c) separating said agglomerate by centrifuging from the residual juice.

2. The process of claim 1 wherein the vegetable material is alfalfa.

3. The process of claim 1 wherein, prior to pressing, the vegetable material is mixed with a source of sulphite ion in the amount of about 0.01 to 0.5 parts of sulphite ion per 100 parts (dry weight) of vegetable material.

4. The process of claim 1 wherein, prior to pressing, the vegetable material is mixed with an alkalizer in an amount to provide a pH of about 6 to 8.

5. The process of claim 1 wherein the agglomerate from step (c) is heated to about 70–90° C. to convert it from a jelly-like material to a readily-dryable curdy material.

6. The process of claim 1 wherein the agglomerate from step (c) is adjusted to a pH of about 8–8.5 and heated to about 70–90° C. to convert it from a jelly-like material to a readily-dryable curdy material.

7. The process of claim 1 wherein the agglomerate from step (c) is heated to about 70–90° C. to convert it from a jelly-like material to a readily-dryable curdy material, and wherein said curdy material is pressed to reduce its moisture content, and then dehydrated.

8. The process of claim 1 wherein the residual juice from step (c) is acidified to a pH of about 3 to 4.8 to precipitate a cytoplasmic protein fraction essentially free from chlorophyll, carotenoids, and lipids.

9. The process of claim 1 wherein the residual juice from step (c) is heated to about 70 to 90° C. to precipitate a cytoplasmic fraction essentially free from chlorophyll, carotenoids, and lipids.

10. The process of claim 1 wherein the residual juice from step (c) is acidified to a pH of about 3 to 4.8 and heated to about 65–80° C., whereby to precipitate a cytoplasmic protein fraction essentially free from chlorophyll, carotenoids, and lipids.

11. A process for fractionating fresh, green alfalfa, which comprises:
    (a) mixing the alfalfa with a source of sulphite ion in an amount to provide about 0.01 to 0.5 parts of sulphite ion per 100 parts (dry weight) of alfalfa,
    (b) pressing the so-treated alfalfa to produce a juice and a press cake,
    (c) adjusting the pH of the juice, where necessary, to a pH of about 6–7, heating it to a temperature of about 55–70° C. in a period of about 0.6 second or less, holding the juice at said temperature for a period of about 0 to 40 seconds, and rapidly cooling it to a temperature of about 40–45° C., whereby to form an agglomerate containing chloroplastic proteins, chlorophyll, carotenoids, and lipids, while retaining cytoplasmic proteins in solution in the juice, and
    (d) removing the said agglomerate by centrifuging from the residual juice.

12. The process of claim 11 wherein the agglomerate from step (d) is heated to about 70–90° C. to convert it from a jelly-like material to a readily-dryable, water-expressible, curdy material.

13. The process of claim 11 wherein the aggregate from step (d) is heated to about 70–90° C. to convert it from a jelly-like material to a readily-dryable, water-expressible, curdy material, and wherein said curdy material is pressed to reduce its moisture content, and then dehydrated.

References Cited

UNITED STATES PATENTS

| | | | |
|---|---|---|---|
| 2,600,903 | 6/1952 | Miller | 99—2 |
| 3,637,396 | 1/1971 | Hollo et al. | 260—112 X |
| 3,684,520 | 8/1972 | Bickoff et al. | 99—8 |

FOREIGN PATENTS 705,369  3/1954  Great Britain.

OTHER REFERENCES

J. of Biol. Chem., vol. 49, 1921, pp. 63–91, Osborne et al.

Biochemical J., vol. 33, 1939, pp. 110–122, Lugg.

J. Sci. Food Agric., July 1961, pp. 502–512, Chayen et al.

Chem. Abstracts, vol. 76, 1972, 97966z, Kohler et al.

HOWARD E. SCHAIN, Primary Examiner

U.S. Cl. X.R.

426—210, 212